United States Patent
Meier et al.

(10) Patent No.: US 8,884,490 B2
(45) Date of Patent: Nov. 11, 2014

(54) ROTOR OR STATOR FOR AN ELECTRODYNAMIC MACHINE WITH SEGMENT BLOCKS CONSTITUTING A STATOR OR ROTOR RING AND METHOD FOR MANUFACTURING SUCH A STATOR OR ROTOR

(76) Inventors: Hans Meier, Pforzheim (DE); Hubert Scheich, Eiterfeld (DE); Hugo Isert, Dermbach (DE)

( * ) Notice: Subject to any disclaimer, the term of this patent is extended or adjusted under 35 U.S.C. 154(b) by 771 days.

(21) Appl. No.: 13/119,439

(22) PCT Filed: Oct. 15, 2008

(86) PCT No.: PCT/EP2008/008700
§ 371 (c)(1),
(2), (4) Date: Mar. 17, 2011

(87) PCT Pub. No.: WO2009/049864
PCT Pub. Date: Apr. 23, 2009

(65) Prior Publication Data
US 2011/0204743 A1    Aug. 25, 2011

(30) Foreign Application Priority Data
Oct. 15, 2007   (DE) .......................... 10 2007 049 596

(51) Int. Cl.
| | |
|---|---|
| *H02K 1/06* | (2006.01) |
| *H02K 5/00* | (2006.01) |
| *H02K 15/02* | (2006.01) |
| *H02K 1/14* | (2006.01) |

(52) U.S. Cl.
CPC ...................................... *H02K 1/148* (2013.01)
USPC .............. 310/216.009; 310/216.008; 310/89; 29/598; 29/596

(58) Field of Classification Search
CPC .................................. H02K 1/18; H02K 1/187
USPC .............. 310/216.008, 216.009, 216.045, 89, 310/216.007, 216.053, 216.057, 216.058, 310/216.088, 216.086, 216.113
See application file for complete search history.

(56) References Cited

U.S. PATENT DOCUMENTS 4,048,530 A * 9/1977 Kaufman, Jr. .................. 310/89
4,465,946 A    8/1984 Springer
(Continued)

FOREIGN PATENT DOCUMENTS

| DE | 42 31 921 | 6/1995 |
|---|---|---|
| DE | 198 05 981 | 8/1999 |

(Continued)

OTHER PUBLICATIONS

Oxford English Dictionary, Term "Clamp" & "Hook", Dec. 1, 2012.*

*Primary Examiner* — Tran Nguyen
*Assistant Examiner* — Thomas Truong
(74) *Attorney, Agent, or Firm* — Clark & Brody

(57) ABSTRACT

A stator (32, 132, 232) or rotor for an electrodynamic machine, in particular for a torque motor acting as an internal or external rotor, comprises a plurality of partly annular plate segments (10, 110, 210) which are stacked in a manner to constitute several partly annular plate segment blocks (34, 134, 234). Combined into a ring, said blocks constitute the stator (32, 132, 232) or rotor the particular adjacent plate segment blocks (34, 134, 234) being mutually clamped by a clamping means. This clamping means already may be integrated into said plate segment blocks or it may be constituted by a housing (145, 245) of which the segments (148, 248) can be clamped against one another. If illustratively the housing (145) is emplaced externally around the stator (132) then the inside diameter of said housing may be varied during installation of the stator (132) or rotor in a manner that the housing may be positioned around the installed plate segment blocks (34, 134) and also may be radially clamped against them.

10 Claims, 20 Drawing Sheets

(56) References Cited

U.S. PATENT DOCUMENTS

| | | | |
|---|---|---|---|
| 4,942,324 A * | 7/1990 | Ooyama et al. | 310/216.007 |
| 5,382,859 A | 1/1995 | Huang et al. | |
| 5,714,827 A * | 2/1998 | Hansson | 310/216.002 |
| 5,767,602 A | 6/1998 | Sargeant | |
| 5,786,651 A * | 7/1998 | Suzuki | 310/216.009 |
| 6,781,278 B2 * | 8/2004 | Liao | 310/254.1 |
| 6,804,874 B2 * | 10/2004 | Niimi et al. | 29/596 |
| 6,891,299 B2 * | 5/2005 | Coupart et al. | 310/156.55 |
| 6,933,649 B2 * | 8/2005 | Fujii et al. | 310/216.045 |
| 7,511,399 B2 * | 3/2009 | Lung et al. | 310/216.055 |
| 2002/0047425 A1 | 4/2002 | Coupart et al. | |
| 2004/0012284 A1 * | 1/2004 | Denton et al. | 310/89 |
| 2004/0020027 A1 * | 2/2004 | Shiah | 29/596 |
| 2004/0217669 A1 | 11/2004 | Fujii et al. | |
| 2006/0232143 A1 * | 10/2006 | Purvines et al. | 310/43 |

FOREIGN PATENT DOCUMENTS

| | | |
|---|---|---|
| DE | 103 52 814 | 6/2005 |
| DE | 10 2004 048 461 | 4/2006 |
| EP | 1 120 882 | 8/2001 |
| EP | 1 760 861 | 3/2007 |
| JP | 59-086441 | 5/1984 |

* cited by examiner

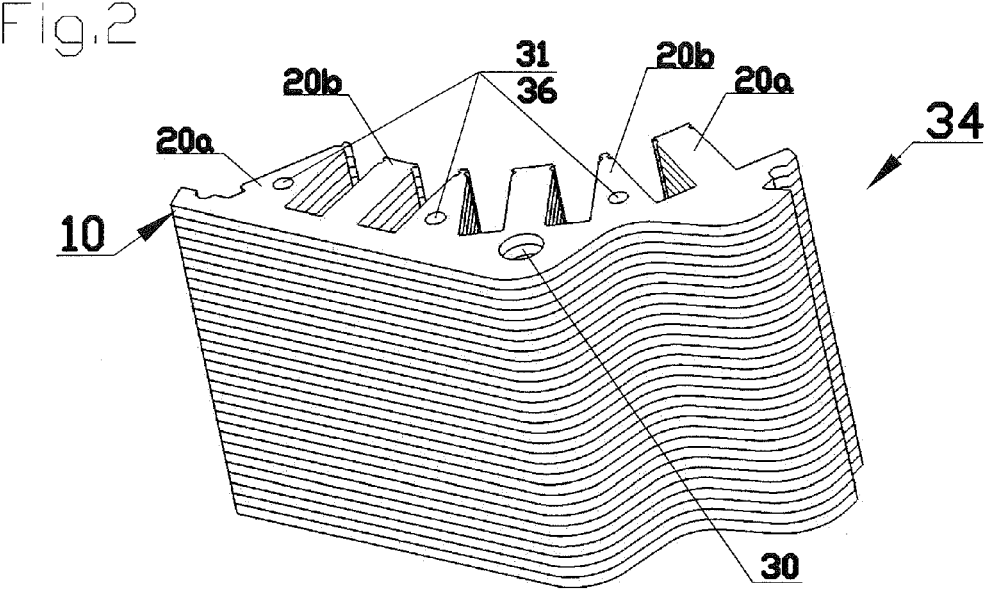
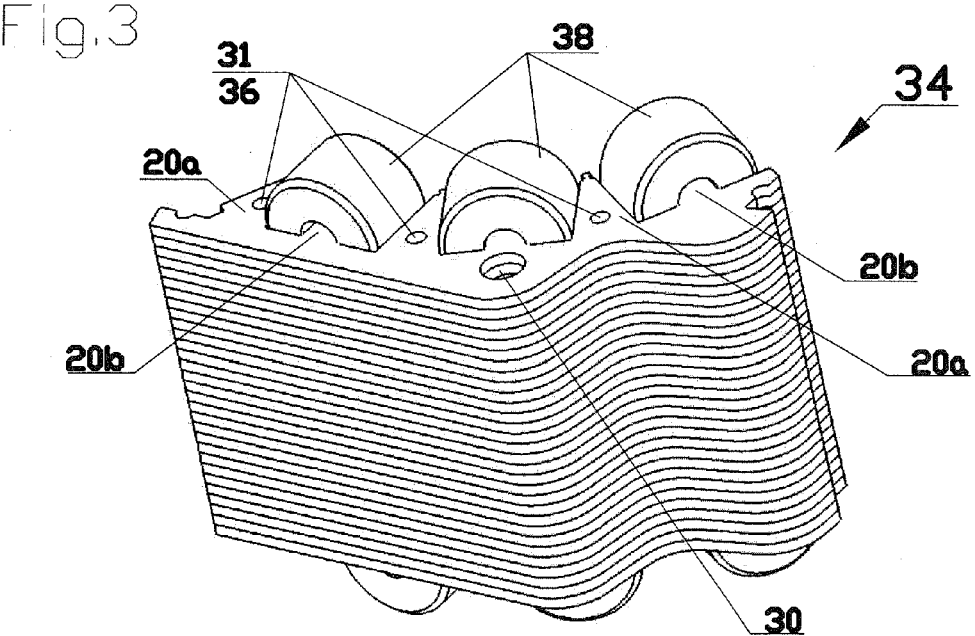

ROTOR OR STATOR FOR AN ELECTRODYNAMIC MACHINE WITH SEGMENT BLOCKS CONSTITUTING A STATOR OR ROTOR RING AND METHOD FOR MANUFACTURING SUCH A STATOR OR ROTOR

FIELD OF INVENTION

The present invention relates to a rotor or stator for an electrodynamic machine, in particular for a torque motor, said rotor or stator being fitted with a plurality of stacked, partly annular plate segments which together constitute a ring of annular segments in which coil arrays may be received. This invention moreover relates to a method for manufacturing such a rotor or stator as well as an electrodynamic machine fitted with such a rotor or stator.

BACKGROUND ART

Stators and rotors composed of a plurality of plate segments receiving coil arrays are known in the state of the art. For simplicity, only stators are considered below, though the designs of course apply as well to rotors.

Conventionally stators are made of a plurality of partly annular plate segments. These partly annular plate segments are stamped out of sheetmetal and then combined and stacked into rings. The plate segments are offset from one another to stabilize the generally unstable stacked plate segments. The individual plate segments are fitted with passage apertures which during assembly are slipped onto positioning pins to attain predetermined positioning and orientation of the plate segments.

Once the ring composed of plate segments has been put together, protrusions constituted at the inner periphery of the plate segments will receive coil arrays which are wound manually or using special winding apparatus. Then a hollow-cylindrical respectively annular housing is slipped over the outer periphery of the plate elements. Lastly the entire assembly as a rule is cast (potted) in a plastic in order to attain final dimensional stability required in the subsequent application. To cast said assembly, it is slipped onto a mandrel which centers it and also serves as an inner casting form. The housing serves as the outer form.

This manufacturing procedure incurs the substantial drawback that given a torque to be generated by the final electrodynamic motor, limits are placed on minimizing the stator size. This drawback is also incurred regarding increasing the torque when the stator size is kept constant. This difficulty arises in part because enough space must be allowed in the stator's inside space defined by the assembled plate segments for winding the coil arrays. Moreover, because of said winding, when the plate segment ring already has been assembled, only a low packing factor is attained as a result of said winding, said factor being typically between 35 and 40%. Obviously pre-wound coil arrays might also be used, which subsequently shall be inserted into the inner space defined by the installed plate segments. This procedure however negatively affects the stator design size because the subsequent stator insertion shall require more space for winding.

Another problem arising in the above manufacture of stators is that gaps are subtended, during plastic casting, between the outer periphery of the annularly stacked plate segments and the inside diameter of a housing slipped over said segments—if there is such a housing, where said gaps fill with plastic during its casting. As a result direct contact is lacking at many sites between the plate segments and the housing, the heat transfer from the plate segments to the stator being commensurately degraded. Therefore subsequent operation of the stator may entail overheating the electrical machine due to inadequate heat dissipation.

In the light of the above state of the art, one objective of the present invention is to create a stator or rotor of an electrodynamic machine or the like based on a different design, further an alternative method to manufacture such a stator or rotor, also an electrodynamic machine fitted with such a stator or rotor, where said drawbacks at least shall be mitigated.

SUMMARY OF THE INVENTION

The stator or rotor of an electrodynamic machine of the present invention comprises a plurality of partly annular plate segments. In this invention, the stator or rotor is characterized by stacking the plate segments in a way to constitute several partly annular blocks of plate segments which when joined to each other form the stator or rotor.

Contrary to the case of the aforementioned state of the art, the plate segments are not mutually offset when stacked to form the stator or rotor, instead they are stacked on each other to be substantially flush with each other to generate partly annular blocks of plate segments. For that purpose the partly annular plate segments are fitted preferably with at least one passage hole to receive a rivet pin which positions and/or connects the plate segments to each other when the partly annular plate segment blocks are manufactured. Advantageous several passage holes receiving a plurality of rivet pins are used, as a result of which a predetermined orientation can be imparted to the plate segments when being stacked. Some of the passage holes also may be used to pass self-threading screws for instance to affix housing parts of said motor to the segment block annulus.

Plate segment blocks offer the considerable advantage that they may be fitted with coil arrays before being combined into an annulus. Accordingly post-winding or mounting the coil arrays is no longer required, hence the otherwise needed space no longer is mandatory. As a result a much higher packing factor may be attained and easily may be well above 70%. As a result an electrodynamic motor may be designed which offers a larger torque for the same size. Therefore the power output or the size of the electrodynamic motor may be optimized; clearly a combination of improved power output and improved size also is feasible.

The plate segments preferably are designed so that, following installation of plate segment block, at least one coil array is affixable to the block, though several coil arrays of course also may be affixed to one such block. For that purpose the plate segments preferably are fitted with at least one protrusion to which one coil array can be affixed, said protrusion in turn being designed in a manner allowing slipping or plugging the coil array onto it. This design as well allows simple and quick installation. Alternatively, the coil arrays may be wound on the minimum of one protrusion of each plate segment block. Preferably however the coil arrays will be prefabricated components.

Advantageously the stator or rotor comprises at least one fastener to affix the coil array to a plate segment block. Illustratively said fastener is a planar element inserted for instance in receiving grooves fitted into a plate segment block after the corresponding coil array was positioned on the plate segment block.

Following their installation, the coil arrays are soldered or crimped to each other to be electrically connected. Soldering or crimping the coil arrays is advantages in the sense that the insulated coating on the coil array conductors for instance in the form of an enamel need not be removed in a separate step, the pertinent zone of coating being automatically removed during soldering resp. crimping.

To assemble the plate segment blocks in simple manner, the partly annular plate segments preferably comprise connection elements configured in a manner that they can be affixed to each other and that they connect frictionally and/or in geometrically locking manner the partly annular plate segment blocks to each other when being installed. Advantageously the connection elements are designed in a way that they engage one another in hook-up or clamping manner. The plate segment blocks may be combined like clamping rings and be mutually clamped. This tightening firmly and accurately connects the segment blocks to each other. Additional affixation or retention means are not required. Nor is finishing work required on the rotor or stator units so made.

In another embodiment mode of the invention, the connection elements may be designed in a manner that they can be affixed to one another when reducing a diameter or an external dimension of the mutually connected plate segment blocks. For that purpose the connection elements can be structured to receive a clamping pin between them when reducing the inside diameter of the mutually connected plate segment blocks. However the outside diameter, or in the case of a non-circular outer contour, the outer size, may also change. In such an embodiment mode the connection elements may be made to engage each other initially in a relatively loose manner, terminal positioning and final orientation being implemented by reducing the diameter resp. the outer size of the mutually connected plate segment blocks, namely when inserting the clamping pins.

Moreover the plate segments preferably may structured in a way to subtend cooling ducts when in the assembled state, a coolant being free to flow through said ducts during operation of the electrodynamic machine.

In a further embodiment mode of the invention, the stator or rotor comprises an annular housing affixable to the plate segment blocks. Advantageously the housing inside diameter may be changed during stator or rotor installation in a way that the housing may be positioned around the installed plate segment blocks and can be radially clamped on them. In other words the housing inside diameter may be displaced between two positions at a minimum. In the first position the housing inside diameter is larger than the outside diameter of the assembled plate segment blocks, as a result of which the housing may be easily slipped over the outside diameter of the installed plate segment blocks and be mounted on them. The play—between the housing inside diameter in its first position and the outside diameter of the installed plate segment blocks—which is required in this instance, depends on the size of the annular stator or rotor and may be in the range of 1 to 3 mm. Once the housing has been slipped on the installed plate segment blocks, the housing inside diameter may be moved into its second position wherein the housing is clamped radially against the plate segments, whereby no play remains in the second position between the housing inside diameter and the outside diameter of the installed plate segment blocks. This feature assures appropriate contact between the plate segments of the plate segment blocks and the housing, guaranteeing excellent heat transfer from the plate segments to the housing.

In an alternative embodiment mode, for instance regarding an external rotor motor, the housing also may be inserted internally into the stator ring against which it can be clamped by inserted clamping pins.

Accordingly the housing preferably shall be like a clamping ring. Moreover it consists of several housing segments each constituting a partial ring. Preferably connection elements affixable to each other by reducing or enlarging the housing inside diameter are used to connect the housing segments. Preferably the connection elements are integral with the housing segments, the connection elements of one embodiment mode advantageously being designed that, in their appropriate state, they engage each other in hooking manner and, to fix their positions relative to each other while reducing the housing inside diameter, they receive a clamping pin between themselves as elucidated by means of the second embodiment mode discussed below. In a further embodiment mode, the housing inside diameter is enlarged when the clamping dowel is inserted, as a result of which the housing segments are affixed internally to the stator ring.

At least one rotation-suppressing means is provided to prevent the housing positioned around the installed plate segments of the stator or rotor from rotating relative to the plate segments while said housing is being clamped in place and during the ensuing casting. Said system illustratively may be implemented by protrusions and recesses provided at the inner housing periphery and at the outer periphery of the plate segment blocks, said protrusions and recesses engaging one another in the installed state.

Preferably at least one cooling duct allowing a coolant to flow through it is subtended in the housing to cool the stator or rotor.

Taking into account weight and heat conductivity, the housing preferably shall be made of aluminum.

The present invention moreover relates to a method for manufacturing a stator or rotor of the above described kind. In this method, the plate segments first are assembled into partly annular plate segment blocks, whereupon coil arrays are mounted on these plate segment blocks. Thereupon the plate segment blocks fitted with said coil arrays are combined.

When the stator or rotor is fitted with a housing, this housing following the assembly of the partly annular plate segment blocks fitted with the coil arrays shall be positioned around the assembled plate segment blocks and clamped against them Preferably the plate segment blocks are assembled preferably using a mandril centering said blocks, as a result of which the housing may be slipped easily onto the outer periphery of the plate segments. In order to impart the required stability to the entire configuration for the subsequent application, the plate segments preferably are imbedded in a plastic. During the casting required for said imbedding, the housing(s) and/or the mandril(s) are advantageously used as forms resp. casings of a mold.

Lastly the invention discussed below relates to an electrodynamic machine comprising a stator or rotor of the above described kind.

BRIEF DESCRIPTION OF THE DRAWINGS

Embodiment modes of the present invention are elucidated below in relation to the appended drawings.

FIG. 2 is a perspective view of a plate segment block composed of a plurality of the plate segments of FIG. 1.

FIG. 3 is a perspective view of the plate segment block of FIG. 2 with inserted coil arrays.

Identical reference numerals below denote identical or similar components.

DETAILED DESCRIPTION OF THE INVENTION

Figure 1:
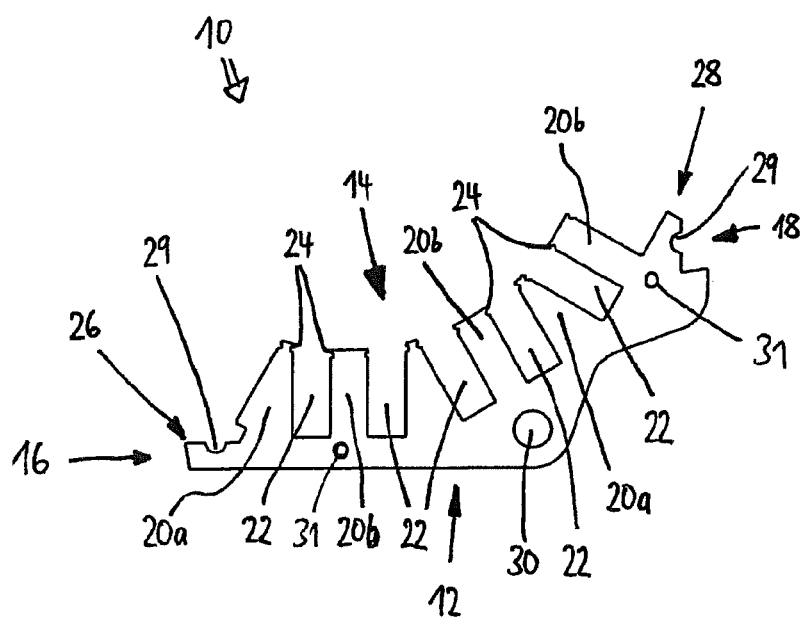
FIG. 1. 1 is a topview of a stator plate segment of a first embodiment mode of the invention.

FIG. 1 shows a topview of a plate segment 10 of a stator for an inner rotor motor 48 of a first embodiment mode of the present invention. The plate segment 10 is a stamped sheet-metal part having an outer side 12, an inner side 14 and two mutually opposite end faces 16 and 18 which together subtend a partly annular geometry. The inner side 14 substantially comprises wedge-shaped protrusions 20a and substantially rectangular protrusions 20b configured alternatingly next to each other. A substantially rectangular recess 22 is present between, i.e. separates, the protrusions 20a and 20b. Each protrusion 20b together with the two adjoining recesses receives on a coil array as elucidated further below in relation to FIG. 3.

Notches 24 are subtended near the ends of each protrusion 20a, 20b pointing to the inner side 14, each notch 24 of a protrusion 20a being associated to an opposite notch 20b of a protrusion 20b. In the installed state of a plurality of the plate segments 10 of FIG. 1, the individual notches 24 constitute grooves into which fasteners 25 (not shown here) in the form of elongated plate elements can be inserted (see FIG. 4). These plate elements 25 secure coil arrays 38 which are deposited on the protrusions 20b of the plate segment blocks 34 as discussed in further detail below in relation to FIG. 7.

Figure 4:
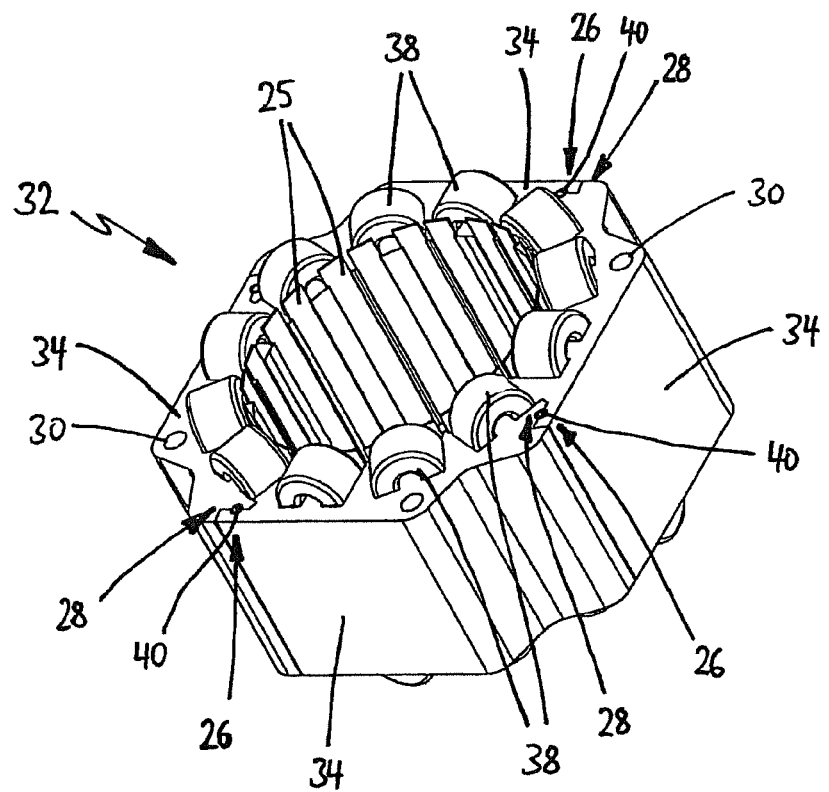
FIG. 4 is a perspective view of the plate segment blocks shown in FIG. 3 with stator ring composed of installed coil arrays.
Figure 6:
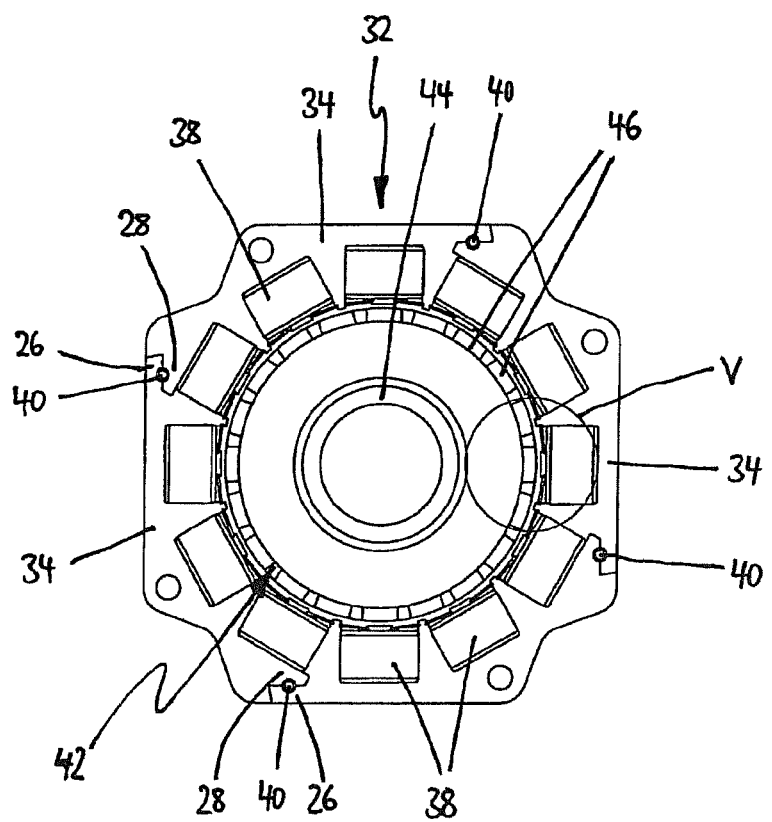
FIG. 6 is a topview of the stator ring shown in FIG. 5.

A hook- or L-shaped connection element 26 is subtended at the end face 16 of the plate segment 19, whereas the end face 18 constitutes a complementary connection element 28. The connection elements 26, 28 join to each other, in frictional and geometrically interlocking manner, two adjacent plate segments 10 when several plate segments 10 are configured next to one another to constitute a plate segment ring. As shown in FIGS. 4 and 6, the connection elements 26, 28 of two adjacent plate segments 10 jointly subtend a passage aperture 29 to receive a clamping pin 40 (not shown here) as further discussed below in relation to FIG. 4.

Lastly each plate segment 10 comprises a passage hole 30 to receive (omitted) threaded bolts 54 and at least two further passage holes 31 to receive rivet pins 36 (also omitted).

FIG. 2 is a perspective view of a plate segment block 34. This plate segment block is manufactured by positioning several plate segments 10 shown in FIG. 1 flush one above the other. The circular passage apertures 30 of the plate segments 10 first are slipped onto omitted positioning pins to allow accurate orientation of the said segments 10 relative to each other. Rivet pins 36 are inserted and then pressed into the further passage apertures 31. Said rivet pins are used to firmly connect the plate segments 10 to one another. The positioning pins shall be removed once the plate segments 10 have been firmly linked to each other. The passage holes 30 free thereby receive threaded bolts 54 when the motor 48 is installed in order to fix in place an upper and a lower lid—as shall be elucidated further below in relation to FIG. 8.

FIG. 3 is a perspective view of the plate segment block 34 shown in FIG. 2 with coil arrays 38 slipped resp. deposited on it. The prefabricated annular coil arrays 38 each are plugged onto protrusions 20b, as a result of which sad coil arrays reach as far as into the recesses 22. After the coil arrays 38 have been slipped on, omitted fasteners 25 in the form of plate elements are moved into the notches as shown in further detail in FIGS. 4 and 7 to preclude said coil arrays 38 from slipping off the associated protrusions 20b.

FIG. 4 is a perspective view of a stator configuration, where four of the plate segment blocks 34 of FIG. 3 are combined into an annular body. All four plate segment blocks 34 here constitute a closed stator resp. stator ring 32, each connection element 26 of a plate segment block 34 engaging the connection element 28 of an adjacent plate segment block 34. Clamping pins 40 are inserted into the passage apertures 29 generated in the connection elements 26, 28 when the plate segment blocks 34 are combined, as a result of which said plate segment blocks 34 are firmly affixed and oriented relative to each other. For that purpose half-passage holes 29 are subtended in the adjacent connection elements 26, 28 in such manner, and oriented relative to each other, that during clamping pin insertion, the particular adjacent plate segment blocks 34 are drawn together at a controllable force, the connection elements 26, 28 of each plate segment 10 linking up in geometrically interlocking manner and the external sides 12 lining up flush and merging into each other nearly seamlessly.

The coil arrays 38 are connected to each other by soldering or crimping. Soldering or crimping is advantageous in that the insulating coating deposited on the wires of the coil arrays 38 such as enamel does not require a separate removal step, said method removing it automatically.

Figure 5:
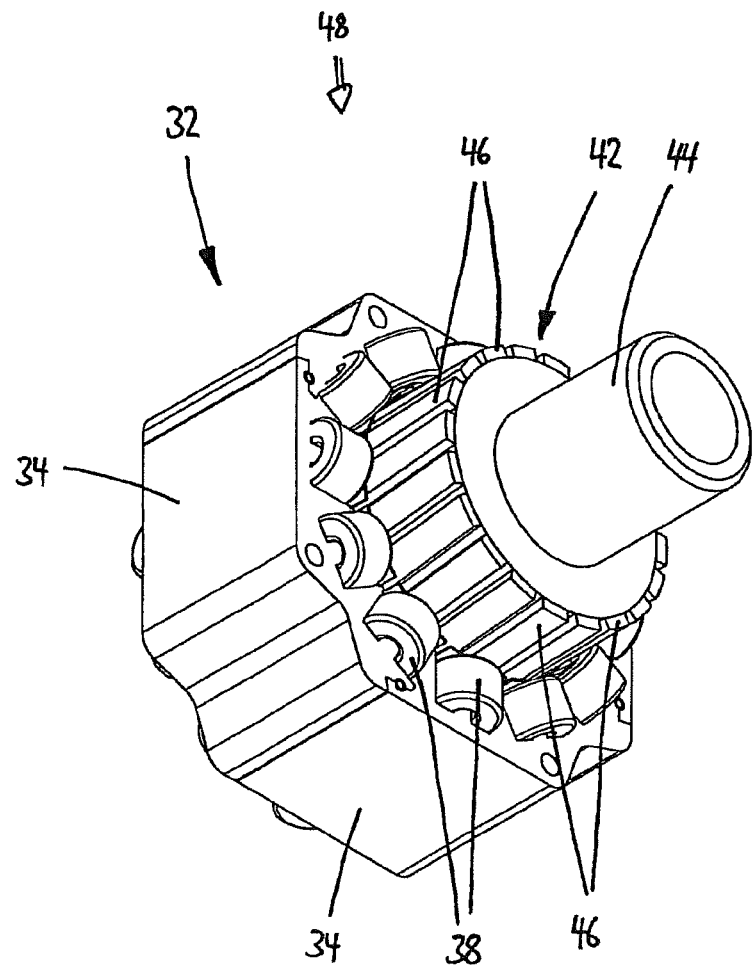
FIG. 5 is a perspective view of the stator ring of FIG. 4 with inserted rotor.

FIG. 5 is a perspective view of the stator configuration 32 shown in FIG. 4 in this instance receiving a rotor 42. This rotor 42 comprises a hollow shaft 44 fitted at its surface with permanent magnets 46 cooperating with the coil arrays 38. The permanent magnets 46 are rounded in relation to the stator's inside diameter and therefore optimally match this stator, as a result of which the space required to receive the rotor 42 can be reduced further. The ratio of coil configurations 38 to permanent magnets 46 in the present instance is 3:5, as more clearly indicated in FIG. 6 which is a topview of FIG. 5.

Figure 7:
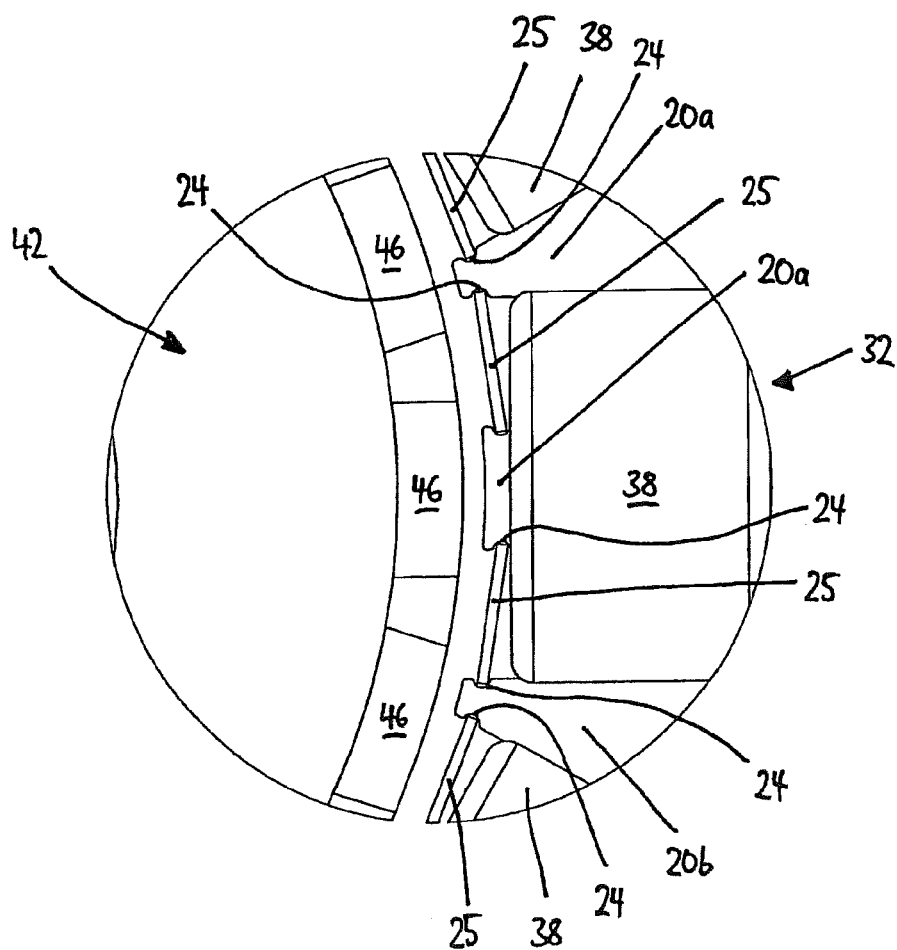
FIG. 7 is an enlarged view of the zone denoted by V in FIG. 6, showing the affixation of a coil array in a plate segment block.

FIG. 7 is an enlarged view of the region denoted by V in FIG. 6. This enlargement shows particularly clearly how the coil arrays 38 are affixed by the fasteners 25 inserted into the notches 24.

Figure 8:
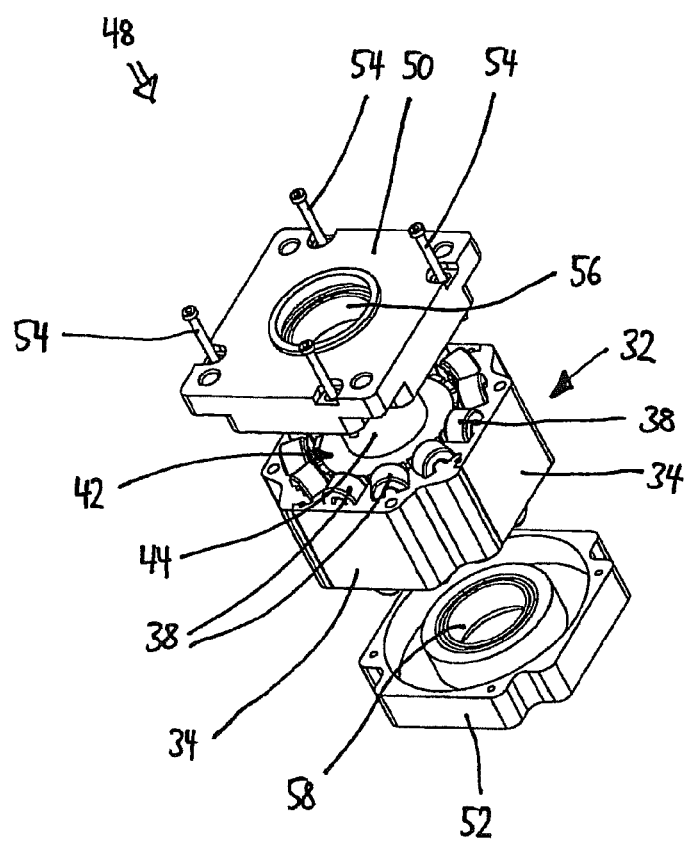
FIG. 8 is an exploded perspective view of a torque motor of the design shown in FIG. 5.
Figure 9:
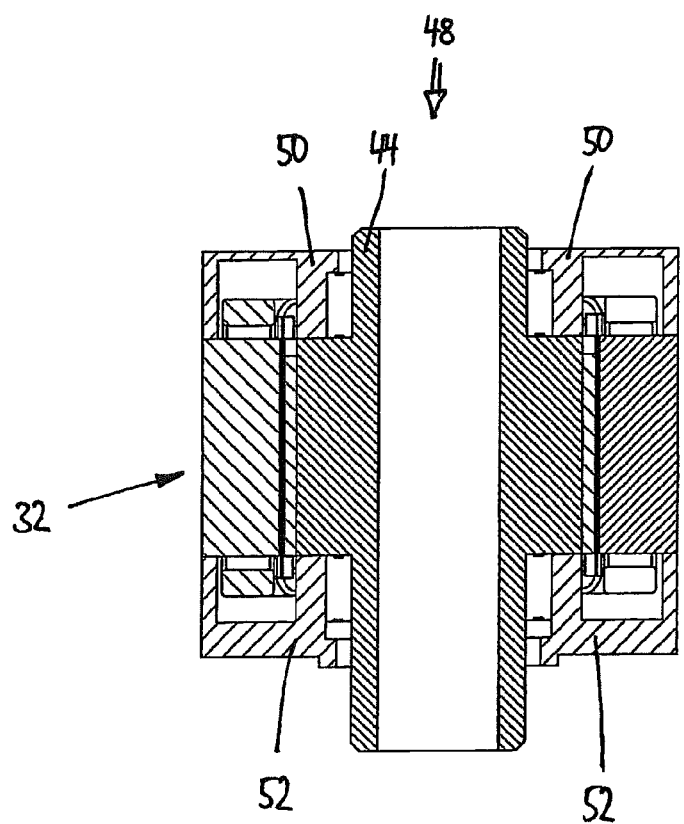
FIG. 9 is a cross-sectional view of the torque motor shown in FIG. 8 in the assembled state.

FIG. 8 is an exploded perspective view of a torque motor 48 comprising a stator-rotor unit 32, 42 such as shown in FIGS. 5 through 7. FIG. 9 shows a sectional view of the installed motor 48.

Together with its plate segment blocks 34, the stator 32 constitutes part of the motor housing whereas the rotor 42 is the internal rotor. An upper lid 50 and a lower lid 52 installed resp. at the top and the bottom of the stator 32 and are connected to each other by threaded bolts and affixed to the stator 32. The threaded bolts 54 are inserted for that purpose into the borehole apertures 30 of the plate segment blocks 34.

The upper lid 50 and the lower lid 52 each comprise a central cylindrical passage aperture 56, 58 to receive the hollow shaft 42. The torque motor 48 of this design offers minimal size and optimal power output. Illustratively the invention offers a torque motor having an outer diameter of about 56 mm. The minimum outer diameter of known torque motors on the other hand has been about 100 mm at comparable power output.

Figure 10:
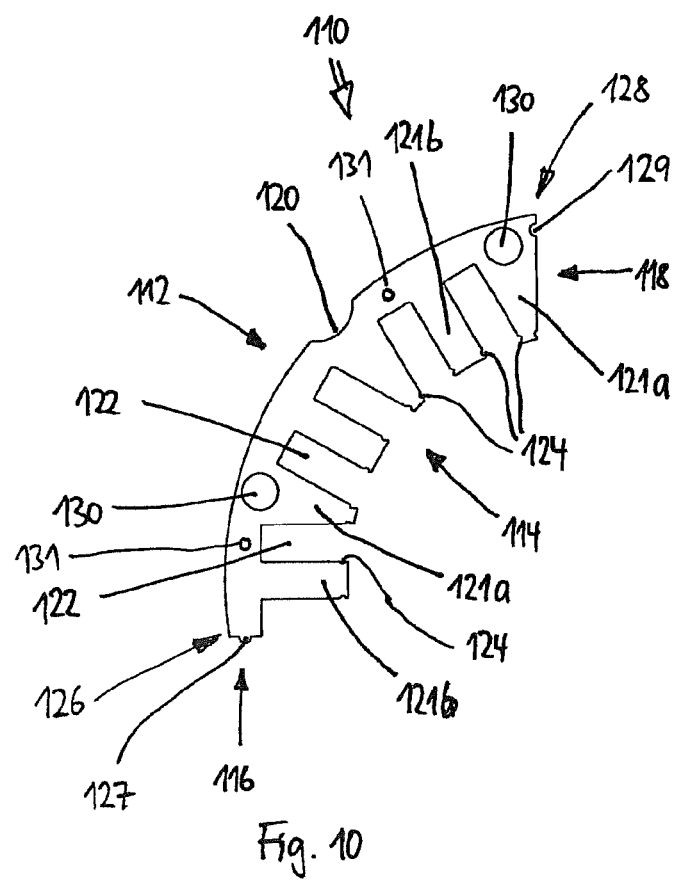
FIG. 10 is a topview of a plate segment of a stator of a second embodiment mode of the invention.

FIG. 10 shows a topview of a plate segment 110 for a stator 132 of a second embodiment mode of the present invention.

The plate segment 110 is a stamped sheetmetal part having an outer side 112, an inner side 114 and two mutually opposite end faces 116 and 118 which between them subtend a partly annular shape. The outer side 112 is in the form of an arc of circle fitted with an arcuate indentation 120 constituting one part of rotation-suppressing means which is elucidated further below. The inner side 114 also is substantially in the form of an arc of circle, and just as does the plate segment 10 of the first embodiment mode, it is fitted with a set of nearby protrusions 121a and 121b and, between said protrusions, further with recesses 122, the protrusions 121a and the recesses 122 adjacent to them receiving coil arrays 138 as already shown in FIG. 3 in relation to the invention's first embodiment mode.

Near the inner side 114, each recess 122 is fitted with mutually opposite notches 124, which, in the assembled state of a plurality of plate segments 110 will subtend grooves. Omitted fasteners 182 in the form of elongated plate elements can be inserted into said grooves and hold the coil arrays 138 in the recesses 122 as was already shown in FIGS. 4 and 7 relating to the first embodiment mode (also see FIG. 12).

A substantially L-shaped connection element 126 is constituted at the end face 116 of the plate segment 110 whereas a connection element 128 complementary to the connection element 126 is constituted at the opposite end face 118. The connection elements 126, 128 line up plate segments 110 relative to each other and also position them when several plate segments 110 are configured to be mutually adjacent in order to constitute a plate segment ring. As further shown by FIG. 10, the connection element 126 is fitted at the end face side with a semi-circular protrusion 127 whereas a semi-circular aperture 129 corresponding to said protrusion 127 is constituted at the opposite end face 118 of the connection element 128. The protrusion 127 and the aperture 129 are used in particular as regards small motors to mutually orient and position adjacent plate segments 110 when several plate segment blocks are configured to adjoin each other to constitute a stator ring.

The plate segment 110 comprises one, or as shown in FIG. 10, two circular passage holes 130 which are used during the installation of the plate segment blocks 134 to receive (omitted) clamping pins. In this manner the plate segments 110 are oriented relative to each other accurately and congruently.

Moreover each plate segment 110 comprises two further passage holes 131 to receive rivet pins 136 (not shown). These rivet pins firmly connect the plate segments to each other. The positioning pins will be removed as soon as these plate segments are firmly affixed to one another. The passage holes 130 made accessible thereby will receive threaded bolts (omitted) during motor assembly to allow affixing further housing or motor parts to the stator 132.

Figure 11:
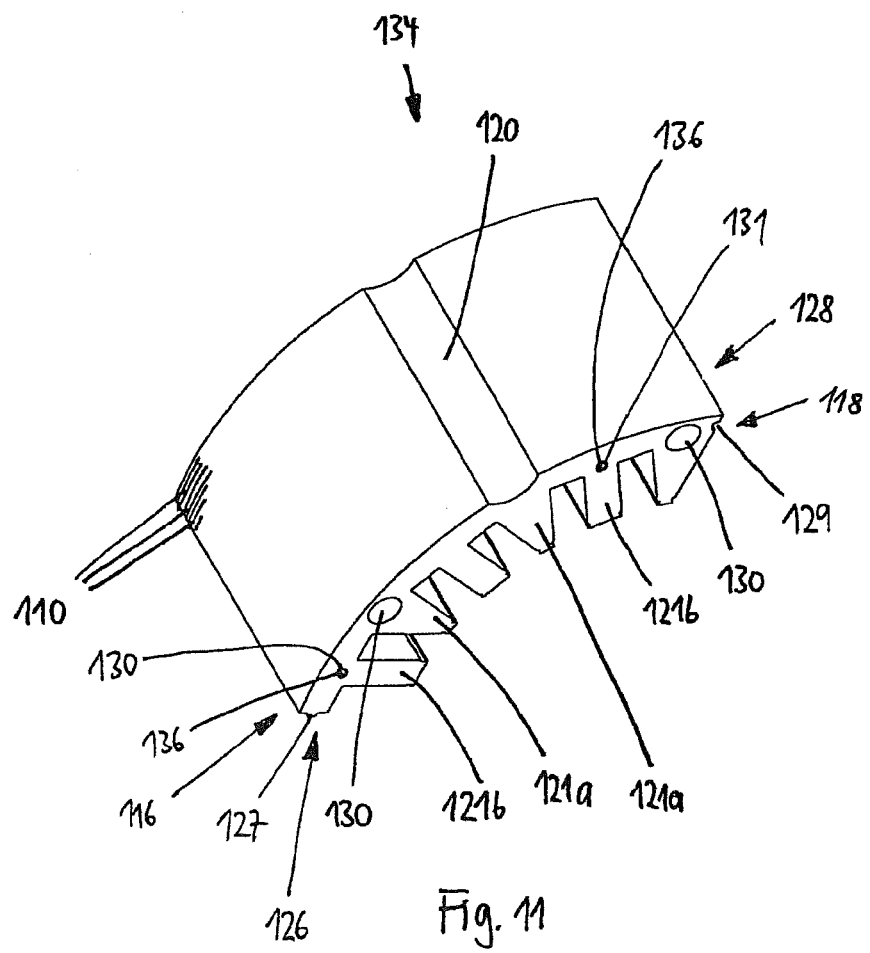
FIG. 11 is a perspective view of a plate segment block consisting of a plurality of the plate segments shown in FIG. 10.

FIG. 11 is a perspective view of a plate segment block 134. Said block is made by superposing a plurality of the plate segments 110 shown in FIG. 10 in aligned manner. The circular passage holes 130 of the plate segments 110 first are slipped onto (omitted) positioning pins in order to accurately align said plate segments 110. Rivet pins 136 are inserted in the further passage holes 131 and compressed therein. The individual plate segments 110 are firmly affixed to each other in this manner. As soon as the plate segments 110 constitute a solid block 134, the positioning pins may be removed from the holes 130.

Figure 12:
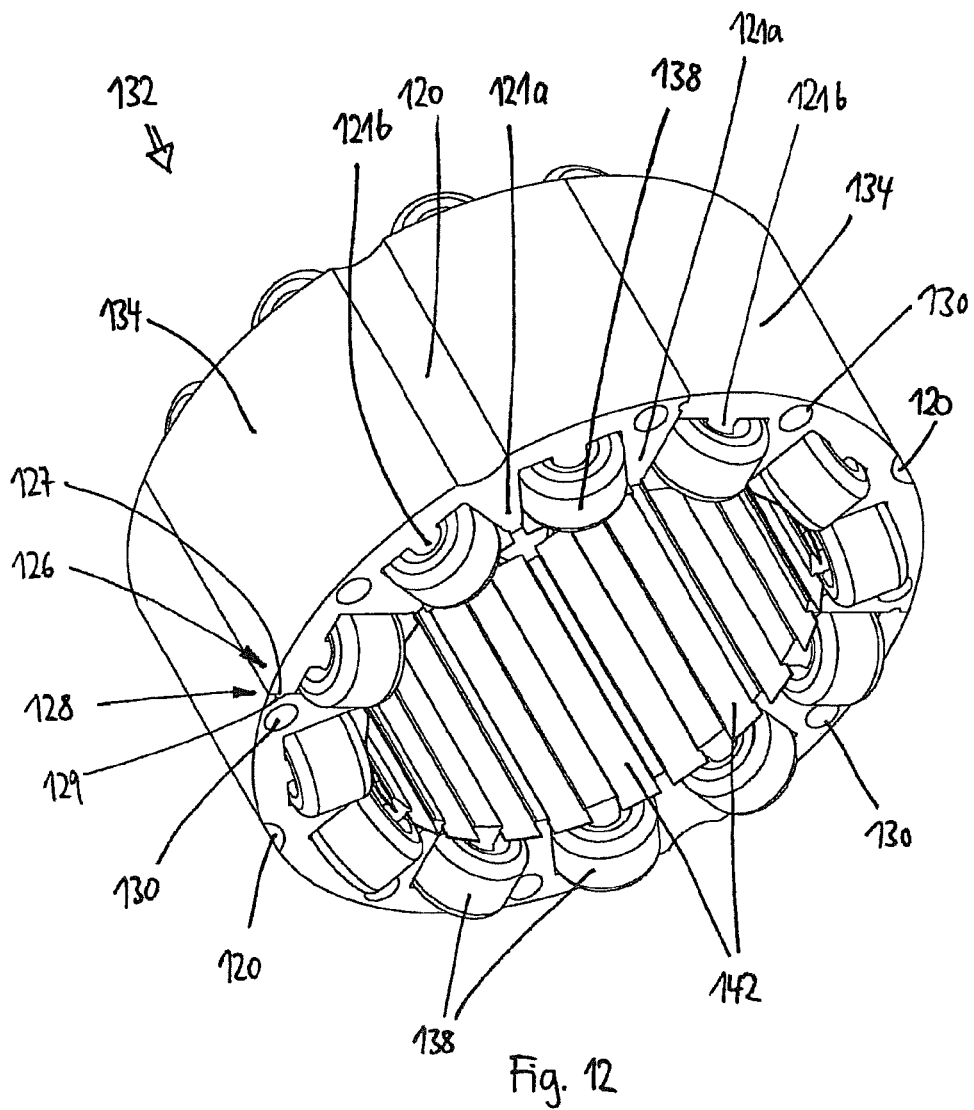
FIG. 12 is a perspective view of the plate segment block of FIG. 11 with inserted coil arrays.

FIG. 12 shows a stator configuration combining four of the plate segment blocks 134 shown in FIG. 11 are combined into a closed stator ring 132. In the process the connection elements 126 of a plate segment block 134 engage in geometrically interlocking manner the connection element 128 of a particular adjacent plate segment block 134, the protrusions 127 in the apertures resp. recesses 129 assuring accurate orientation and high dimensional stability.

The prefabricated annular coil arrays 138 are plugged onto the protrusions 121b of the plate segment 110 resp. the plate segment blocks 134, as a result of which the coil arrays extend into the recesses 122. After the coil arrays 138 have been slipped on, the fasteners 142 in the form of plate elements re inserted into the notches of the protrusions 121a, 121b to preclude said coil arrays from slipping off the protrusions 121b.

Figure 13:
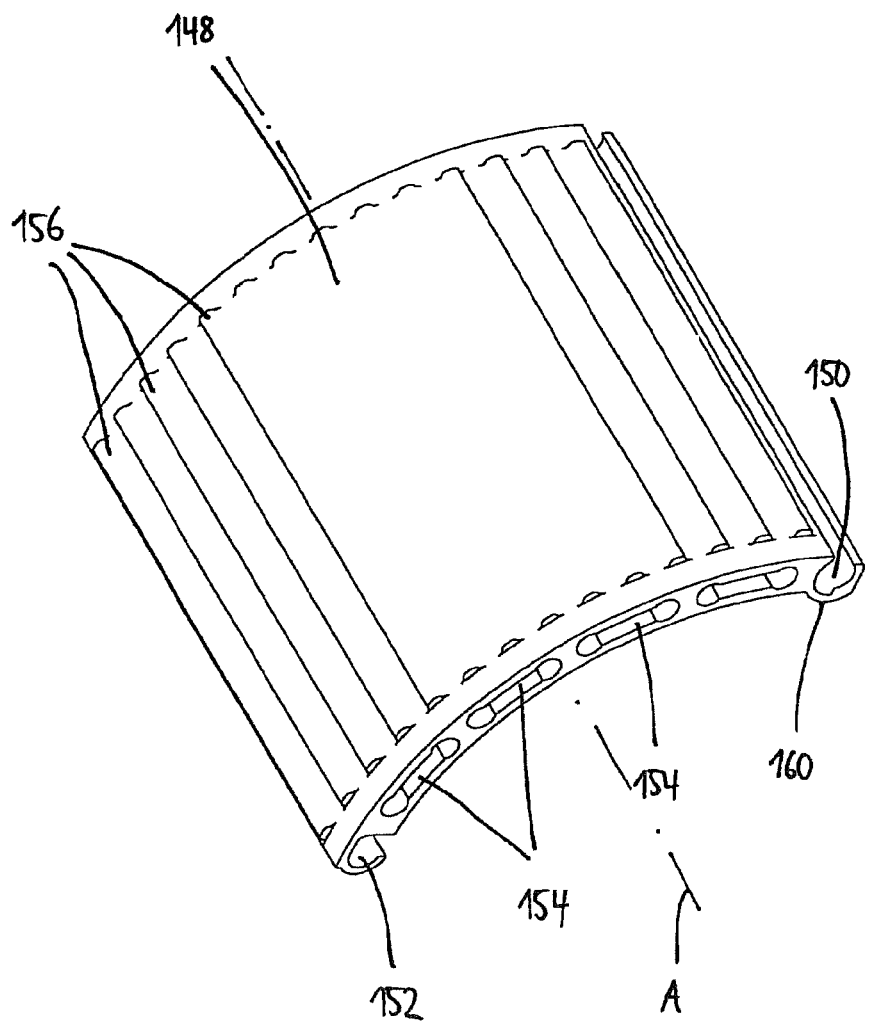
FIG. 13 is a perspective view of a housing segment of a housing according to one embodiment mode of the invention.

FIG. 13 is a perspective view of a housing segment 148 used to make a housing 145 for the stator ring 132 shown in FIG. 12.

Figure 14:
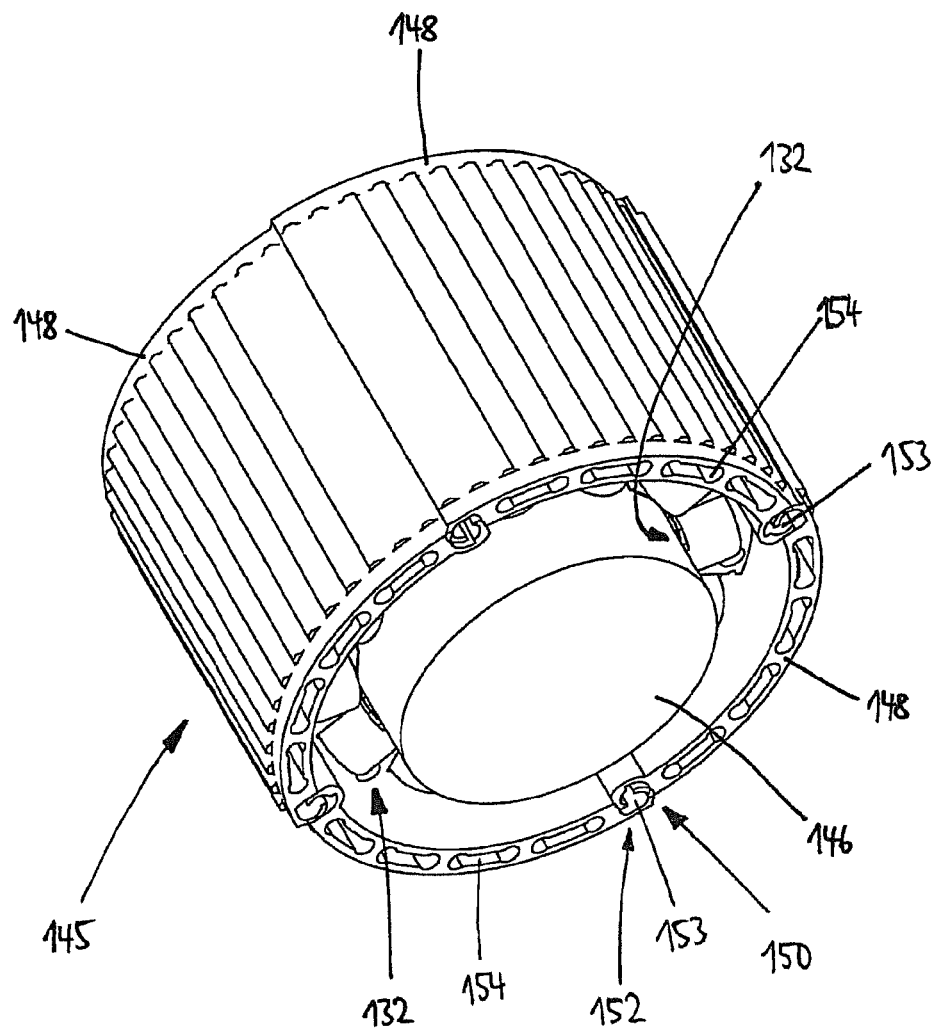
FIG. 14 is a perspective view of the stator ring shown in FIG. 13 enclosed by a housing constituted by the housing segments shown in FIG. 14

The housing segment 148 is substantially partly annular and structured in a way to generate an annular housing 145 when—as shown in FIG. 14—several housing segments 148 shown in FIG. 13—are situated next to each other and are mutually affixed.

Each housing segment 148 comprises connection elements 150 and 152 to affix the housing segments 148 to each other, said elements being designed in a manner that the element 150 of housing segment 148 engages like a hook the connection element 152 of an adjacent housing segment 148, in each case a passage aperture 153 being constituted between the connection elements 150, 152.

Furthermore a plurality of cooling ducts 154 are subtended in each housing segment 148, said ducts in each case running in the axial direction A of the housing 145. Also elevations 156 running in the axial direction A are fitted on the outer side of the housing segment 148 to enlarge the outer surface of the housing segment 148 and in this manner acting as cooling fins for improved heat dissipation.

Figure 15:
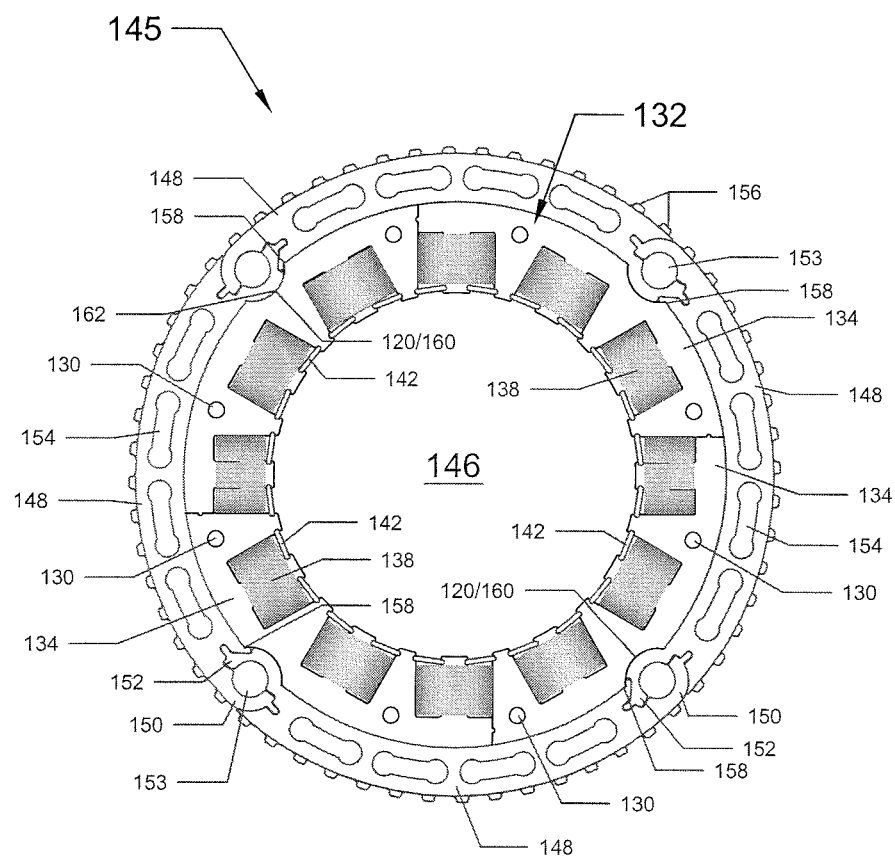
FIG. 15 is a topview of the configuration shown in FIG. 15.

FIGS. 14 and 15 show a configuration where four of the shown housing segments 148 are combined into one ring and are slipped over the stator system 132 of FIG. 12. As shown especially clearly in FIG. 15 the hook-like connection elements 150 and 152 of adjacent housing segments 148 engage each other loosely enough to retain some play in the form of free spaces 158 between the outer periphery of the plate segment blocks 134 and the inner periphery of the housing segments 148, as a result of which the assembled housing segments 148 can easily be slipped over the configuration shown in FIG. 13. Also the radially inward indents 160 of the connection elements 150 cooperate with the indents 120 of the plate segment blocks 134 in such a way that irrotationality is attained to prevent the housing segments 148 from rotating relative to the plate segment blocks 134. In addition the housing segments 148 are aligned relative to the plate segment blocks 134.

Figure 16:
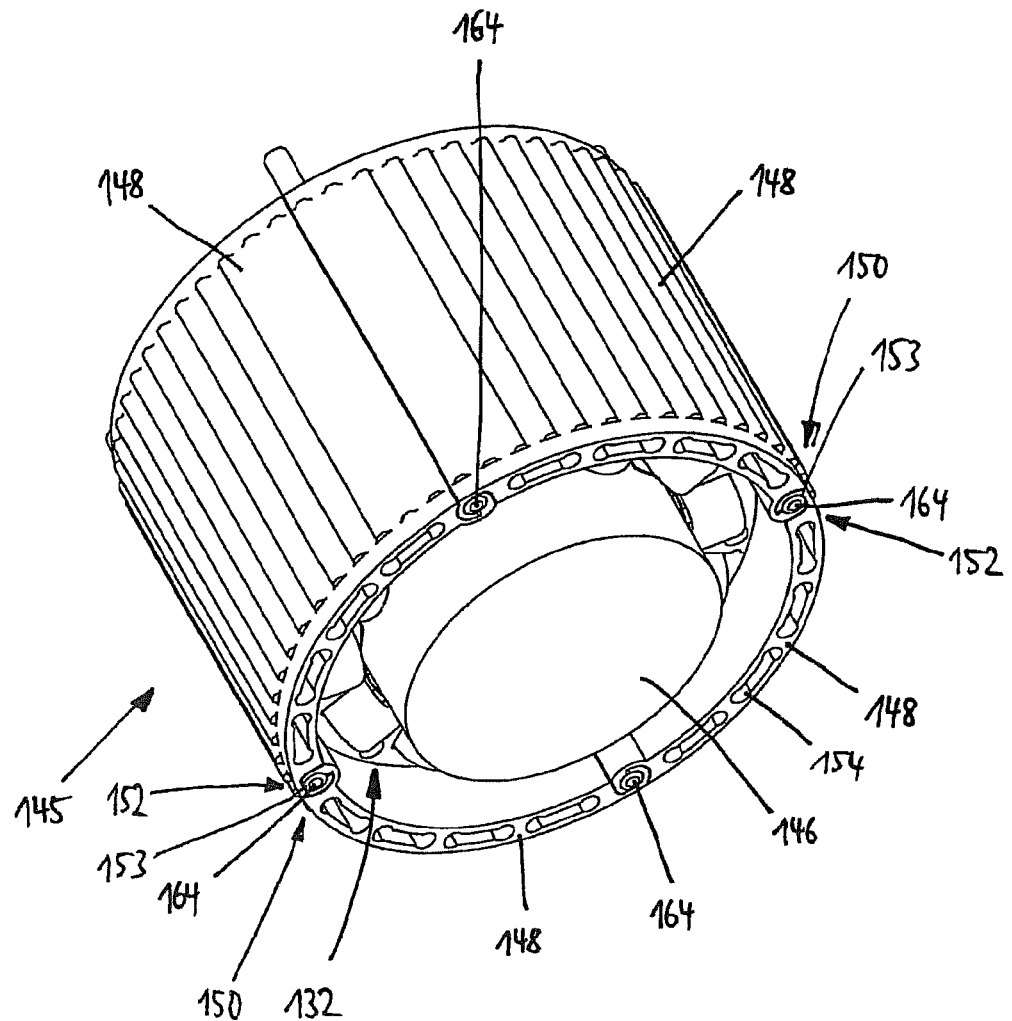
FIG. 16 is a perspective view showing the configuration of FIGS. 15 and 16 in the clamped state.
Figure 17:
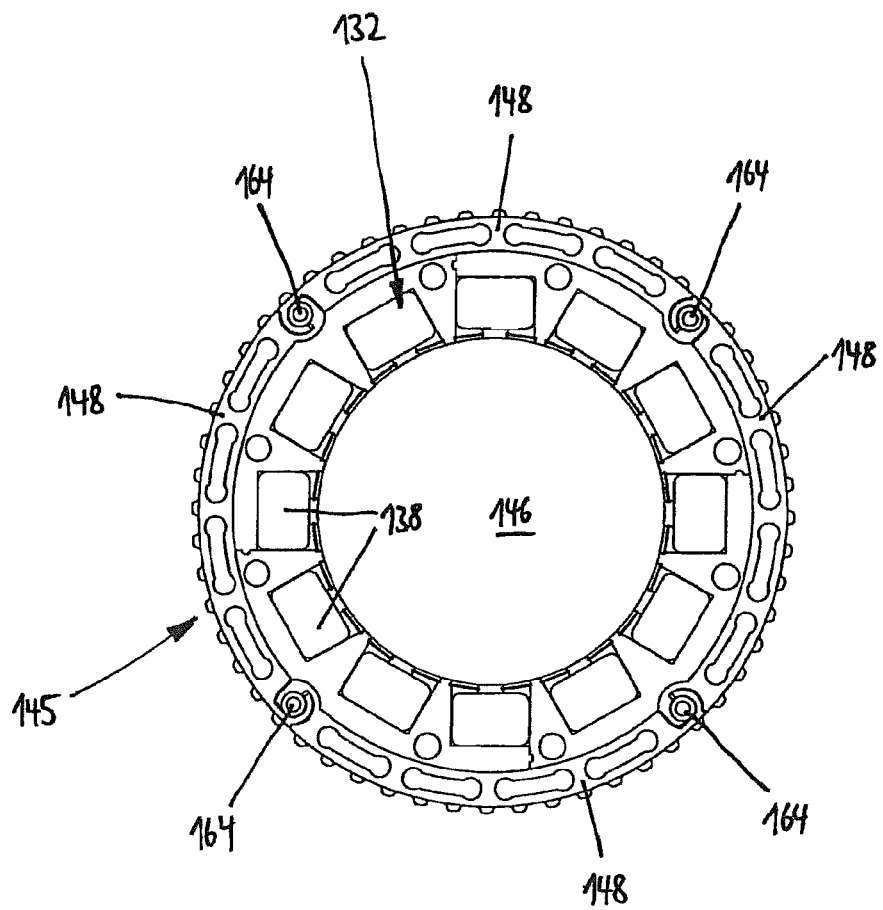
FIG. 17 is a top view of the clamped configuration of FIG. 17.

FIGS. 16 and 17 show the configuration of FIGS. 14 and 15 with clamping pins 164 inserted into the passage apertures 153 defined by the mutually engaging connection elements 150 and 152. Inserting the clamping pins 164 into the passage apertures 153 entails reducing the inside diameter of the housing 145 shown in FIGS. 14 and 15, as a result of which the housing segments 148 are clamped radially by their inside surfaces against the outside surfaces of the plate segment blocks 134. The inside diameter of the clamped housing 145 is selected to be slightly less than the outside diameter of the stator ring 132 which consequently is received in frictional and geometrically interlocking manner in the housing 145. The gaps 162 indicated in FIG. 15 accordingly are completely eliminated without need for finishing work. Instead the housing segments 148 make contact directly with the plate segment blocks 134. This tight contact assures subsequently, when using the stator 132 of the invention, that there is optimal heat transfer between plate segment blocks 134 and the housing segments 148, namely problem-free heat dissipation from the rotor through the housing 145.

To impart additional stability to the configuration of FIGS. 16 and 17, the stator 132 may be cast inside a plastic, a mandrel 146 inserted centrally into the stator and the housing segments 148 acting as forms for said casting.

The above discussion makes it clear that a stator 32, 132 or rotor for an electrodynamic machine, in particular for a torque motor 48, comprises a plurality of partly annular plate segments 10, 110 which are stacked in a way to constitute several partly annular plate segment blocks 34, 134 which, when assembled to each other, constitute the stator 32, 132 or rotor. The stator 32, 132 or rotor may comprise an annular housing 145, the inside diameter of said housing being variable during installation of the stator 32 or rotor in a way that the housing 145 can be positioned around plate segment blocks 134 and may be clamped relative to them.

Figure 18:
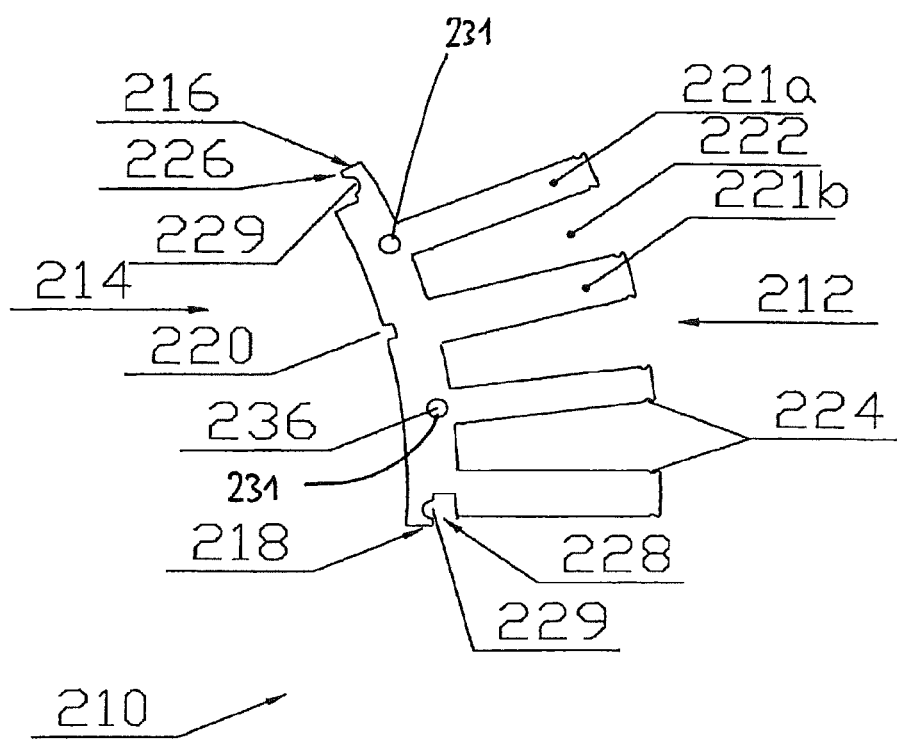
FIG. 18 is a topview of a plate segment of a stator of a further embodiment mode of the present invention.

FIG. 18 is a topview of a plate segment 210 of a stator in an external rotor motor of a further embodiment mode of the present invention.

The plate segment 210 is stamped from sheetmetal and comprises an outer side 212, an inner side 214 and two mutually opposite end faces 216 and 218, jointly subtending between them a partly annular shape. The inner side 214 assumes the shape of a substantially smooth partial arc of circle fitted at one site with an indentation 220 that is part of a rotation-suppressing means that is elucidated further below.

Said outer side 212 includes substantially rectangular protrusions 221a, 221b which alternate while being adjacent to each other, the width of the protrusions 221a being somewhat less than that of the protrusions 221b. A substantially rectangular to slightly wedge-shaped recess 222 is subtended between two adjacent protrusions 221a, 221b and separates them. One protrusion 221b together with two adjacent recesses 222 receives one coil array 238 as already noted in relation to FIGS. 1 through 3, except that in the present embodiment mode the protrusions 221a, 221b and the coils 238 point outward.

Each protrusion 221a, 221b is terminally fitted with two lateral notches 224, each notch 224 being of a protrusion 221a being associated to an opposite notch 224 of a protrusion 221b. In the installed state of a plurality of the plate segments 210 shown in FIG. 18, the individual notches 224 constitute grooves which may receive omitted fasteners 225 in the form of elongated plate elements (see FIG. 21). The plate elements 225 secure the coil arrays 238 deposited on the protrusions 221b of the plate segment blocks 234 as discussed in greater detail in relation to FIG. 7.

An L-shaped connection element 226 is constituted on the end face 216 of the plate segment 210, the opposite end face 218 being fitted with a complementary connection element 228. The connection elements 226, 228 join adjacent plate segments 210 in frictional and geometrically interlocking manner and orient them relative to each other when several plate segments 210 are configured next to one another to constitute a plate segment ring. The connection elements 226, 228 of adjacent plate segments (FIG. 20) jointly subtend a passage aperture 229 to receive an omitted clamping pin 240, as elucidated below in relation to FIGS. 20, 21. Lastly each plate segment 210 may be fitted with an omitted passage hole receiving omitted threaded bolts. At least two further passage holes 231 receive rivet pins 236 connecting the plate segments 210 and orienting them relative to each other.

The individual plate segments 210 are combined into plate segment blocks 234 by congruent superposition of the plate segments 210 shown in FIG. 18. In this procedure the plate segments 210 by means of their circular passage holes are first slipped onto the positioning pins to allow accurately mutually aligning them. Rivet pins 236 are inserted into the further passage holes 231 and compressed therein. They serve to firmly affix and to align the plate segments 210 to and with each other. The positioning pins are removed as soon as the plate segments 210 have been firmly affixed to each other. The passage holes so emptied may receive threaded bolts 54 when installing the motor to allow affixing further extra or housing parts.

Figure 20:
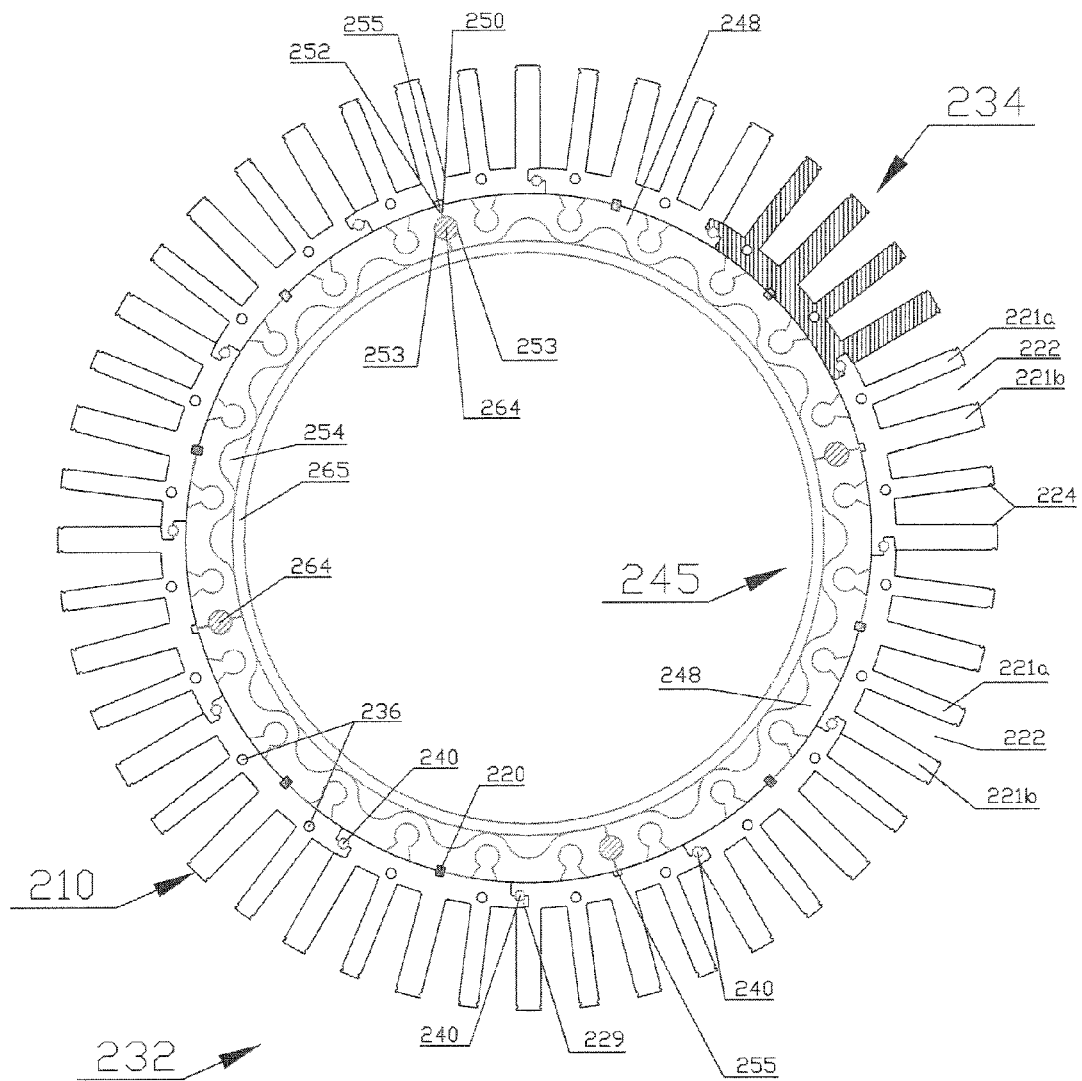
FIG. 20 is a topview of a stator ring receiving a housing constituted by the housing segments of FIG. 19.

FIG. 20 shows a stator configuration 232 in which twelve plate segment blocks 234 are combined into one closed stator ring 232. Each connection element 226 of a plate segment block 234 engages the connection element 228 of an adjacent plate segment block 234. Clamping pins 240 are inserted into the passage apertures 229 the way they are subtended by the particular adjacent connection zones 226, 228 when assembling the plate segment blocks 234, as a result of which said plate segment blocks 234 are clamped by force fitting or the like and aligned relative to one another in a manner that when the clamping pins 240 are inserted, the particular adjacent plate segment blocks 234 shall be pulled toward each other by means of a controlled force, in the process of which the connection elements 226, 228 of each plate segment 10 join each other in geometrically interlocking manner and the inner sides resp. surfaces 214 of the plate segment blocks 234 merge into each other in aligned and nearly seamless manner.

The prefabricated annular coil arrays 238 each are plugged onto the outward-pointing protrusions 221b of the plate segment s 210 resp. the plate segment blocks 234 so that the coil arrays 238 are located in the recesses 222. After the coil arrays 238 have been plugged into place, the fasteners 225 are moved into the notches of the protrusions 221a, 221b to prevent said coil arrays 238 from slipping off the protrusions 221b.

Figure 19:
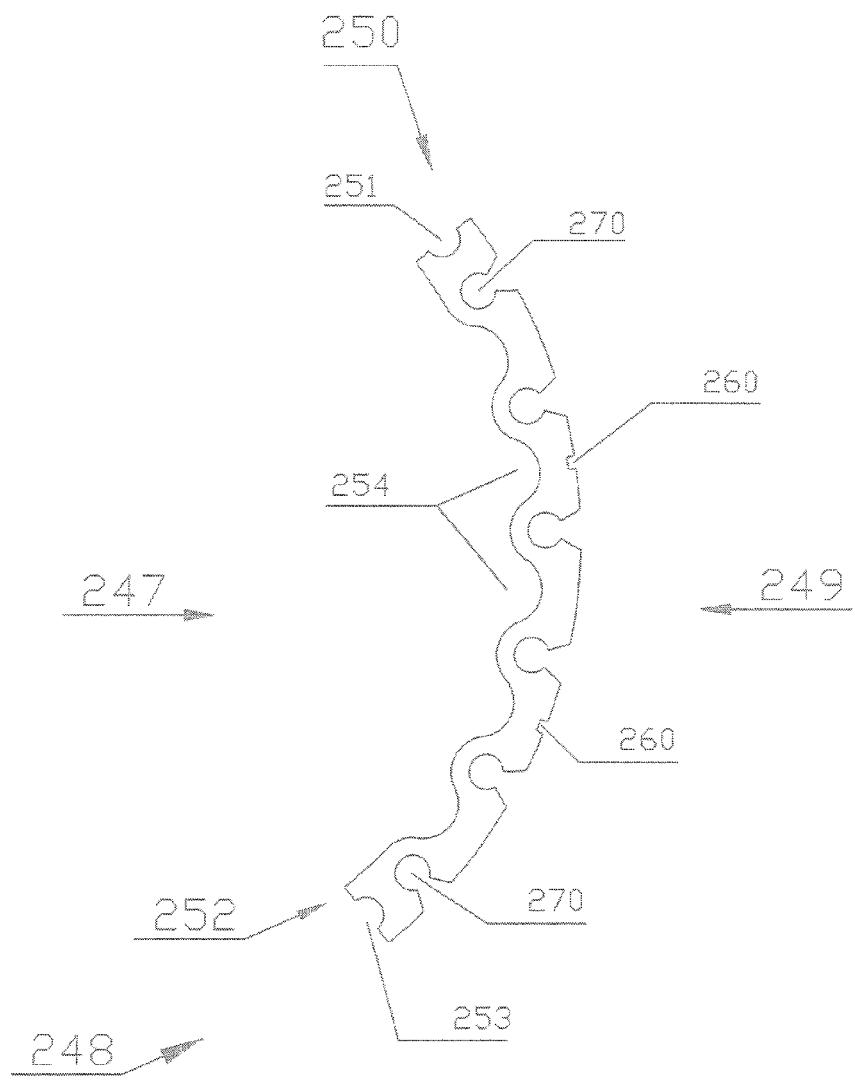
FIG. 19 is a perspective view of a housing segment of a housing according to a further embodiment mode of the invention.

The housing segment 248 design is substantially partly annular and calls for an annular housing 245 when—as shown in FIG. 20—several of the housing segments 248 shown in FIG. 19 are configured next to each other and are mutually clamped. For that purpose each housing segment 248 is fitted at its free end 250 and 252 with a recess 251, 253 designed in a way that when joining two adjacent housing segments 248, each time a passage aperture 255 to receive a clamping pin 246 shall be generated.

A total of four housing segments 248 are assembled into an annular housing 245 in the embodiment mode of FIG. 20, said housing 245 being inserted in the stator configuration 232 constituted by the plate segment blocks 234. In the process the free ends 250, 252 of the housing segments 248 always are opposite, subtending thereby the passage aperture 255 in each case. At the same time the housing segments 248 rest so loosely within the stator ring 232 that some play is left between the inner periphery of the plate segment blocks 234 and the outer periphery of the housing segments 248. The outside diameter of the housing 245 shall increase only when the clamping pins 246 are inserted into the passage apertures 255, whereupon the housing segments 248 are pressed from the inside against the plate segment blocks 234. The housing 245 is thereby affixed in place in frictional and geometrically interlocking manner within the stator ring 232.

Recesses 260 are fitted into the outer periphery 249 of each housing segment 248 and cooperate with the indents 220 of the adjacent plate segments 210 resp. adjacent plate segment blocks 234 to act as rotation-suppressing means. Appropriately a step, a spring or the like is inserted into recesses 220, 260. However the recess 260 may be replaced by an elevation engaging in geometrically interlocking manner the indentation 220 in the plate segment block 234.

Moreover boreholes 270 running in the axial direction may be fitted within a housing segment 248. Said boreholes illustratively may receive (omitted) thread bolts with which to fix in place further housing parts or parts added to the motor. Several undulatory recesses 254 running parallel to the axial direction and to each other may be fitted into the inner periphery 247 of the housing segment 248. Said recesses 254 may be used as cooling fins or, following integration of an inner ring 256 into the housing 245, as cooling ducts, a coolant flowing through the axial ducts.

Figure 21:
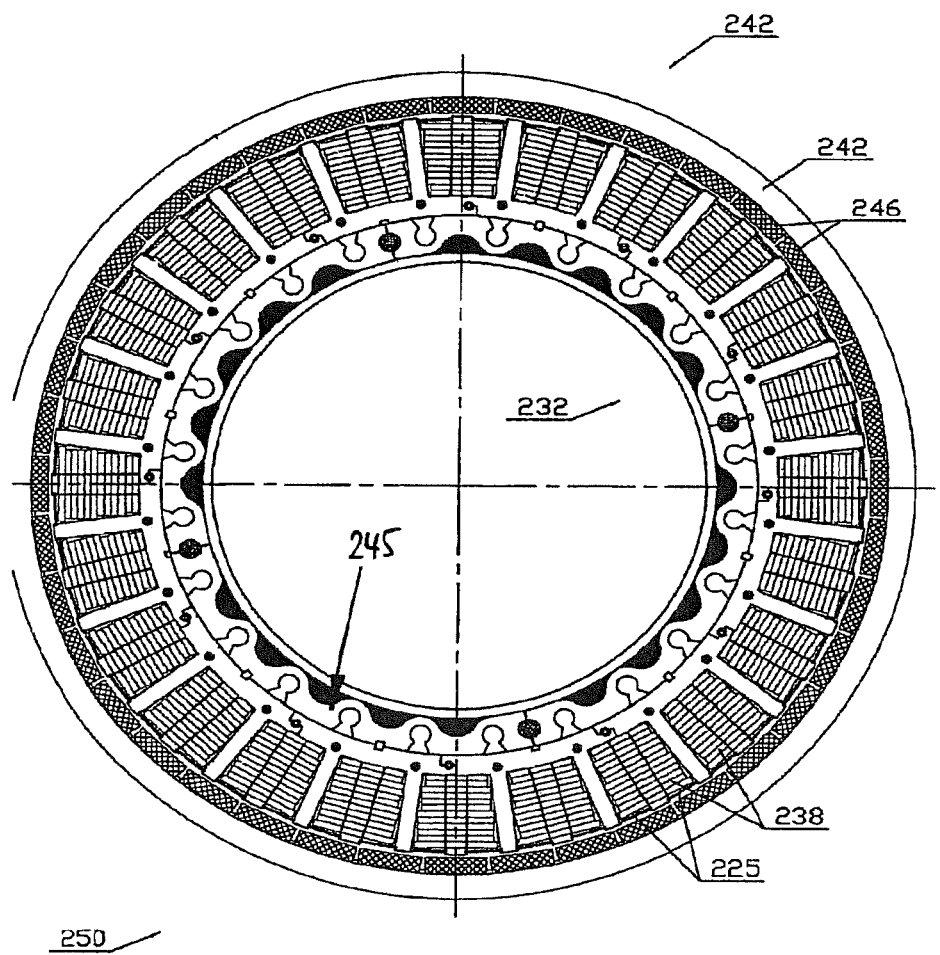
FIG. 21 is a topview of a torque motor acting as an external rotor.

FIG. 21 is a cross-sectional view of an external rotor motor with a stator 232 which is supported inside by a housing 245 and with an external rotor 242 fitted with permanent magnets at its inside periphery.

It is understood that a stator 32, 132, 232, or rotor for an electrodynamic machine, in particular a torque motor, comprises a plurality of partly annular plate segments 10, 110, 210 as its internal or external rotor, said segments being stacked in a manner to constitute several partly annular plate segment blocks 34, 134, 234. Said blocks assembled into a ring constitute the stator 32, 132, 232 or rotor, adjacent plate segment blocks 34, 134, 234 being each mutually clamped by a clamping means. This clamping means may already be integrated into the plate segment blocks 34, 134, 234 or it shall be constituted by a housing 145, 245 of which the housing segments 148, 248 may be clamped mutually or relative to the plate segment blocks 134, 234. Illustratively if the housing 145 is configured externally around the stator 132 or rotor, then the inside diameter of the housing 145 can be so varied during installation of the stator 132 or rotor that the housing 145 may be positioned around the plate segment blocks 34, 134 and can be clamped radially to them.

All features and advantages, inclusive design details, spatial configurations and procedural steps, explicit and/or implicit in the claims, specification and drawings, may be construed being inventive per se or in arbitrary combinations.

LIST OF REFERENCES

A axial direction
10 plate segment
12 outer side
14 inner side
16 end face
18 end face
20a,b protrusion
22 recess
24 notches
25 fastener
26 connection element
28 connection element
30 passage aperture
32 stator
34 plate segment block
36 rivet pin
38 coil array
40 clamping pin
42 rotor
44 hollow shaft
46 permanent magnet
48 torque motor
50 upper lid
52 lower lid
54 threaded bolt
56 passage aperture
58 passage hole
110 plate segment
112 outer side
114 inner side
116 end face
118 end face
120 indentation
121a protrusion
121b protrusion
122 recess
124 notches
126 connection element
127 protrusion
128 connection element
129 aperture
130 passage hole
131 passage hole
132 stator
134 plate segment block
136 rivet pin
138 coil array
140 protrusion
142 fastener
145 housing
146 mandril
148 housing segment
150 connection element
152 connection element
153 passage aperture
154 cooling duct
156 elevation
158 free space
160 indentation
164 clamping pin
210 plate segment
212 outer side
214 inner side
216 end face
218 end face
220 indent
221a protrusion
221b protrusion
222 recess
224 notches
225 fastener 226 connection element
228 connection element
229 passage aperture
230 passage hole
231 passage hole
232 stator/stator ring
234 plate segment block
236 positioning pin/rivet pin
238 coil array
240 clamping pin
242 rotor
245 housing
246 permanent magnet
247 inner periphery
248 housing segment
249 outer periphery
250 torque motor
250 end
251 recess
252 end
253 recess
254 recess/cooling duct
255 passage aperture
260 recess
264 dowel pin
265 inner ring
270 borehole

The invention claimed is:

1. A stator (132) or rotor for an electrodynamic machine, the stator (132) or rotor comprising:
a plurality of stacked partly annular plate segments (110), the plate segments (110) are stacked in a way to constitute several partly annular plate segment blocks (134) which when assembled constitute the stator (132) or rotor,
each plate segment (110) has an outer side (112), an inner side (114), and first and second mutually opposite end faces (168) and (118),
the first end face (116) of each plate segment (110) has a connection element (126) being a protrusion (126), whereas the second end face (118) of each plate segment (110) has a complementary connection element (128) being a recess (129),
at least one coil array (138) is affixed to each plate segment block (134),
an annular housing (145) affixable to the plate segment blocks (134),
the annular housing (145) is composed of housing segments (148),
each housing segment (148) has an inside surface and comprises hook-like connection elements (150) and (152) to affix the housing segments (148) to each other, the hook-like connection elements (150, 152) of adjacent housing segments (148) engage each other, in such a manner that the mutually engaging connection elements (150, 152) defining apertures (153) to receive a clamping pin (164), and that inserting the clamping pins (164) into the passage apertures (153) entails reducing the inside diameter of the housing (145) and clamps the housing elements (148) radially by their inside surface against the outer side (112) of the plate segment blocks (134) whereupon the protrusion (127) and the recess (129) of adjacent plate segment blocks (134) geometrically interlock and assure accurate orientation and dimensional stability.

2. The stator or rotor as claimed in claim 1, characterized in that each plate segment (110) has an outer side (112), an inner side (114) and two mutually opposite end faces (116) and (118),
the outer side (112) is in the form of an arc of circle fitted with an arcuate indentation (120) constituting one part of a rotation-suppressing means,
each connection element (150) of the housing segments (148) has a radially inward indent (160), the radially inward indents (160) of the connection elements (150) cooperate with the indents (120) of the plate segment blocks (134) in such a way that irrotationality is attained to prevent the housing segments (148) from rotating relative to the plate segment blocks (134).

3. The electrodynamic machine comprising the stator or rotor as claimed in claim 1.

4. A method for manufacturing the stator (132) or rotor as claimed in claim 1, said method comprising the procedural steps:
assembling the plate segments (110) into partly annular plate segment blocks (134),
installing the coil arrays (138) on the plate segment blocks (134),
afterwards assembling the partly annular plate segment blocks (134) containing the coil arrays (138) into the stator (132),
assembling the partly annular housing segments (148) into the annular housing (145), by engaging the hook-like connection elements (150, 152) of adjacent housing segments (148),
positioning the housing (145) around the assembled plate segment blocks (134),
clamping the housing (145) against the plate segment blocks (134), by inserting the clamping pins (164) into the passage apertures (153), and hereby
geometrically interlock the protrusion (127) and the recess (129) of adjacent plate segment blocks (134) to assure accurate orientation and dimensional stability of the plate segment blocks (134).

5. Method as claimed in claim 4, characterized in that the plate segment blocks (34, 134) are imbedded in plastic.

6. Method as claimed in claim 5, characterized in that the housing (145) and/or a mandrel (146) are used as casting molds to imbed the plate segment blocks (34, 134) in said plastic.

7. A stator (232) or rotor for an electrodynamic machine, the stator (232) or rotor comprising:
a plurality of stacked partly annular plate segments (210), the plate segments (210) are stacked in a way to constitute several partly annular plate segment blocks (234) which when assembled constitute the stator (232) or rotor,
at least one coil array (238) is affixed to each plate segment block (234),
each plate segment (210) has an outer side (212), an inner side (214), and first and second mutually opposite end faces (216) and (218),
the first end face (216) of each plate segment (210) has a hook- or L-shaped connection element (226), whereas the second end face (218) of each plate segment (210) has a complementary connection element (228),
each connection element (226, 228) has a half-passage hole in such a manner, and oriented relative to each other that the connection elements (226; 228) of two adjacent plate segments (210) jointly subtend a passage aperture (229) to receive a clamping pin (240), and that when the clamping pins (240) are inserted into the passage apertures (229), adjacent plate segment blocks (234) are drawn together at a controllable force, and an annular housing (245) with an outside diameter, the annular housing (245) inserted in the assembled plate segment blocks (234) and affixable to the plate segment blocks (234), the annular housing (245) is composed of housing segments (248), each housing segment (248) is fitted at its free end (250) and (252) with a recess (251, 253) designed in a way that when joining two adjacent housing segments (248), each time a passage aperture (255) to receive a clamping pin (246) is generated, and that the outside diameter of the housing (245) increases when the clamping pins (246) are inserted into the passage apertures (255), hereby the housing segments (248) pressing against the inner side (214) of the plate segment blocks (234).

8. A method for manufacturing the stator (232) or rotor as claimed in claim 7, said method comprising the procedural steps:

assembling the plate segments (210) into partly annular plate segment blocks (234), assembling the partly annular plate segment blocks (234) into a stator ring, by engaging the connection elements (226; 228) of the adjacent plate segments (210) or segment blocks (234), respectively, and by inserting the clamping pins (240) into the passage apertures (229) of the connection elements (226; 228), assembling the housing segments (248) into the annular housing (245), positioning the housing (245) into the assembled plate segment blocks (234), and inserting the clamping pins (246) into the passage apertures (255), hereby increasing the outside diameter of the housing (245) and pressing the housing segments (248) against the inner side (214) of the segment blocks (234).

9. Method as claimed in claim 8, characterized in that the plate segment blocks (34, 134) are imbedded in plastic.

10. The electrodynamic machine comprising the stator or rotor as claimed in claim 7.

* * * * *

UNITED STATES PATENT AND TRADEMARK OFFICE
CERTIFICATE OF CORRECTION

PATENT NO. : 8,884,490 B2
APPLICATION NO. : 13/119439
DATED : November 11, 2014
INVENTOR(S) : Meier et al.

Page 1 of 1

It is certified that error appears in the above-identified patent and that said Letters Patent is hereby corrected as shown below:

On the title page, item (73), the Assignee information should be shown as:

Assignee: Hans Meier, Pforzheim, (DE)

Signed and Sealed this
Twelfth Day of July, 2016

Michelle K. Lee
*Director of the United States Patent and Trademark Office*